July 4, 1939. B. J. KLEERUP 2,164,655
STEREOPTICON SLIDE AND METHOD AND MEANS FOR PRODUCING SAME
Filed Oct. 28, 1937 2 Sheets-Sheet 1
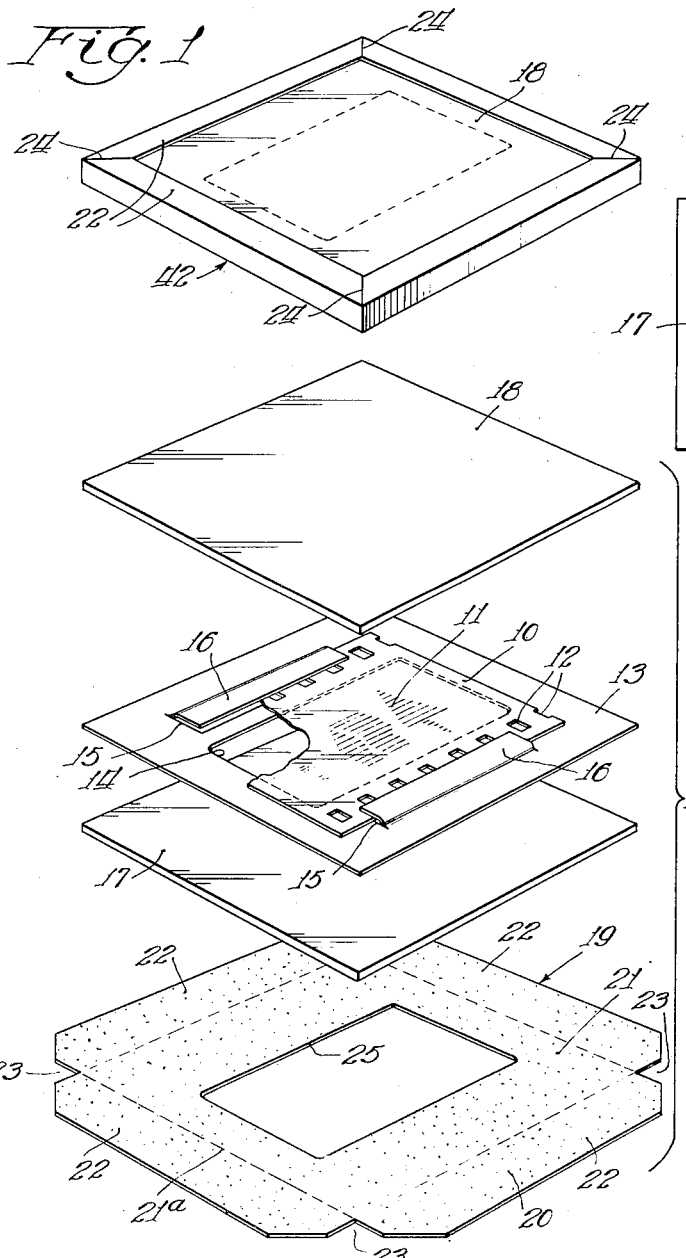
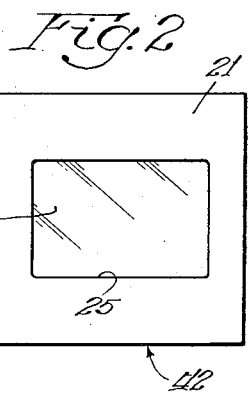
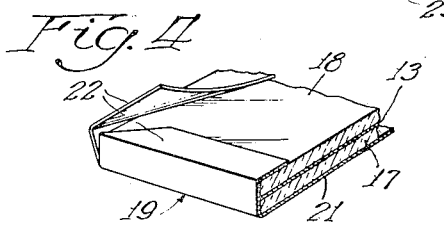
Inventor:
Bertel J. Kleerup
By: A. Trevor Jones
Atty.

July 4, 1939. B. J. KLEERUP 2,164,655
STEREOPTICON SLIDE AND METHOD AND MEANS FOR PRODUCING SAME
Filed Oct. 28, 1937 2 Sheets-Sheet 2
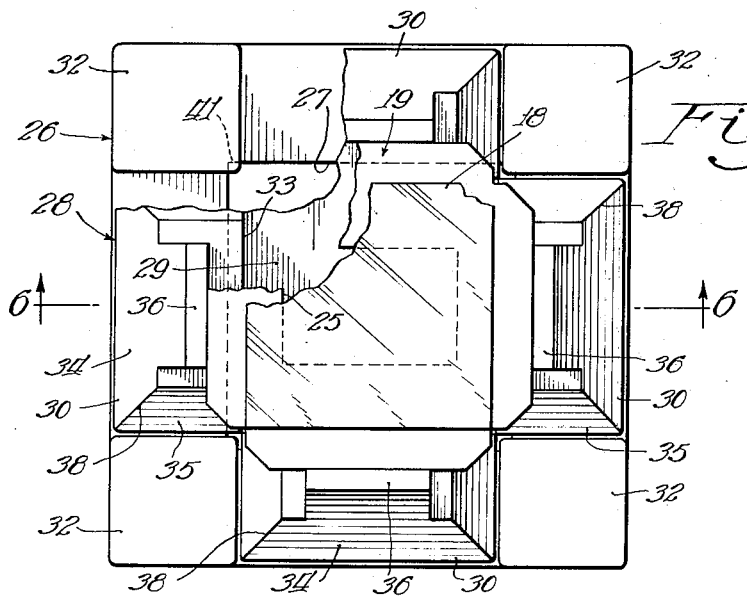
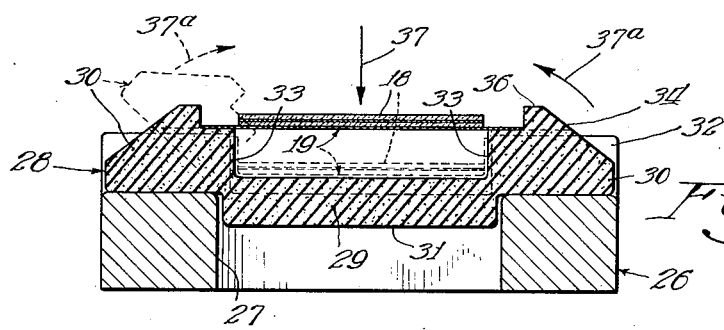
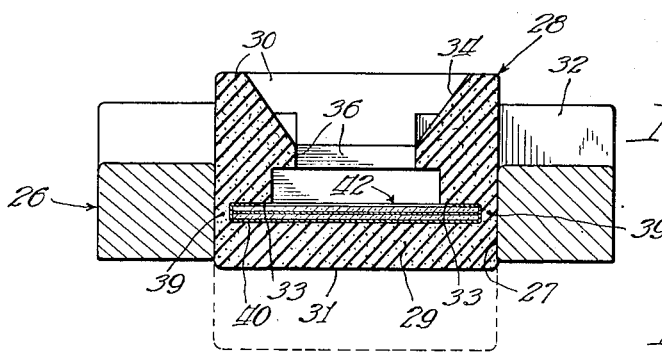
Inventor:
Bertel J. Kleerup
By: A. Trevor Jones
Atty.

Patented July 4, 1939

2,164,655

UNITED STATES PATENT OFFICE 2,164,655

STEREOPTICON SLIDE AND METHOD AND MEANS FOR PRODUCING SAME

Bertel J. Kleerup, Chicago, Ill.

Application October 28, 1937, Serial No. 171,439

4 Claims. (Cl. 88—26)

This invention relates to stereopticon slides and method and means for producing same. It is more particularly adapted to the production of such slides which comprise a picture film mounted on a glass plate and usually between two such glass plates to preserve the film, to keep it in the flat, and to provide a support for the film in connection with the usual stereopticon or projector usage.

The invention aims to provide an improved slide of this class and is inclusive of simple and inexpensive but efficient apparatus for readily mounting the film on the glass, by the use of which the unique method disclosed may be practiced, the invention thus embracing the product, apparatus and method.

An important object of the invention is the production of the improved slide by amateur photographers, in the home, for example, without the necessity for costly apparatus, while at the same time the speed of production is materially enhanced and a better slide is produced.

Other objects and advantages will be apparent from the following description, taken together with the accompanying drawings, in which—

Figure 1 is a perspective view showing the upper face of the slide produced in accordance with the present invention;

Figure 2 is a rear plan view of the slide of Fig. 1 on a slightly reduced scale, and of an actual size common to the art;

Figure 3 is an exploded view of the slide of Fig. 1 on the scale thereof and showing the composite elements of the present slide;

Figure 4 is a fragmentary perspective view, partially in section, of one corner of the composite structure in intermediate form;

Figure 5 is a plan view of the apparatus associated with the slide elements and for producing the slide in accordance with the present invention, parts being broken away for clearness of description;

Figure 6 is a cross-section taken on the line 6—6 of Fig. 5 and indicating in broken lines an intermediate position of the parts; and Figure 7 is a section similar to Fig. 6 but indicating a later position of the parts in the production of the improved slide.

Referring in detail to the illustrative embodiment shown in the drawings, the picture film 10 may be a section of the usual translucent cellulosic strip commonly used for this purpose and having the picture 11 thereon which it is desired to project. The film 10 may be cut from the continuous film strip (not shown) and may be one of a series of pictures taken as either a motion picture or a still picture, perforations 12 in the side margins of the film being for the purpose of moving the film strip through the camera as is well known in the art and which need not be further explained. The film section 10, which it is desired to mount as a slide for stereopticon or other projection purposes, is first desirably supported by a mat 13 generally of black paper and having a central aperture 14 through which the picture 11 is to be visible. One difficulty encountered in locating the film over the aperture 14 has been that the film would easily move after being so located and become disarranged with respect to the mat. Accordingly, I have provided simple but novel means for locating the film on the mat, and comprising slitting the margins of the mat on opposite sides of the aperture 14, as at 15, in three right-angularly related slits to provide lips 16 oppositely but inwardly directed, and beneath which the edges, in this instance the longitudinal edges, of the film 10 may be slipped, thus enabling the film to be readily located transversely with respect to the aperture 14. When the film has been so slid under the lips 16 and located longitudinally with respect to the aperture 14, it has been found that friction between the film edges and the lips 16 will maintain the film in properly located longitudinal position.

With the film so located on the mat 13, the mat, with the superposed film, is placed on a lower glass plate 17, the mat being substantially co-terminous with the plate. Thereupon another or upper glass plate 18, similar to the glass plate 17, is superposed on the lower glass plate with the mat and its film therebetween.

Instead of the usual scotch tape for binding the edges of the composite structure just described and for securing it together, I have provided the novel mask member 19, to one face of which is applied a strong adhesive 20. The mask member 19, which is flexible and also serves as a binding member, has a central portion 21 bounded by the imaginary broken line 21a and which is of the area of the glass plates 17 and 18, and margins 22 which are adapted to be folded about the edges of the glass plates with the mat and film therebetween as best shown in Fig. 4. The corners of the margins 22 are cut away as at 23 so that these corners when folded will just meet, without overlapping, as at 24 of Fig. 1.

The central portion 21 of the mask member 19, in accordance with the present invention, has a central aperture 25 therein which is co-terminous and adapted to be registered with the aperture 14 of the mat 13, the margins of the film 10 being otherwise masked by the central portion of the mask member 19. The mask member 19 is also desirably of black paper or the like, somewhat heavier than the mat 13. This improves the quality of the picture projected with the use of the film, since it shuts off some rays of light about the margin of the film, accentuating the light which is passed through the apertures 25 and 14 and thus through the portion of the film containing the picture 11.

Further in accordance with the present invention, when the composite structure shown in Fig. 3 has been assembled on the surface of the mask member carrying the adhesive, with the glass plates 17 and 18 and the mat 13 co-terminous with the imaginary broken line 21a shown on the mask member 19, and after the adhesive surface 20 of the mask member has been rendered readily adhesive, but before folding the margins 22 about the edges of the glass plates and onto the upper surface of the glass plate 18, the whole is placed on the binding apparatus next described and with which the final mounting step is performed.

The simple hand-press apparatus here disclosed comprises a frame 26 conveniently made of wood and having an over-all area somewhat larger than the area of the mask member 19 when the latter is in the flat. This frame which is desirably somewhat thick for the purpose presently disclosed, has a central opening 27 which is just slightly larger than the area of the glass plates, and through which the composite structure of Fig. 3, together with a sealing pad 28 is adapted to be forced to fold and seal the edges of the mask member about the glass plates, mat and film.

For this purpose the pad 28 is flexible and is preferably made of sponge rubber or the like. It is here shown cruciform, having a central portion 29 of the area of the glass plates, and extensions 30, these extensions being of equal size and shape and which complete the cruciform design. The central portion 29 of the pad is embossed on its lower face as at 31, the embossment thus formed being just received in the central opening 27 in the frame 26, and the extensions 30 being disposed on the upper surface of the frame. Corner posts 32 on the upper surface of the frame receive the extensions 30 snugly therebetween and further fix the initial position of the pad with respect to the frame. The upper faces of the extensions 30 are thickened materially with respect to the area of the pad and have straight vertical inner walls 33 and upwardly tapering sides 34 and 35. The space between the vertical walls 33 forms somewhat of a central recess in the pad of the area of the glass plates, and the extensions 30 each form something in the nature of a vertically and horizontally truncated pyramid. Along the reduced upper areas of these pyramidal-shape sides is further formed an upwardly and longitudinally extending ridge 36 stepped back or outwardly of the vertical walls 33.

When the frame 26 and pad 28 are assembled together as just described, the mask member 19 is located on the pad, the ridges providing stops which contact each of the four edges of the mask member 19 when this mask member is in the flat and thus locating the mask member centrally with respect to the pad. At this time also it will be understood that the superposed glass plates with the film and mat therebetween are superposed on the mask member 19 centrally thereof as shown in full lines in Figs. 5 and 6. When now the glass plate 18 is pressed upon downwardly in the direction of the arrow 37 in Fig. 6, the central portion 21 of the mask member with the superposed glass plates co-terminous therewith is first forced into the space between the vertical walls 33 of the pad extensions. This begins to fold the margins 22 of the mask member 19 about the edges of the glass plates. Upon further pressing the glass plates downwardly the pad is forced into the opening 27 in the frame, the extensions 30 being rotated as indicated by the broken lines and arrow 37a, Fig. 6. The extensions 30 of the pad are finally bent right-angularly to the central portion 29 of the pad and the pad is thus folded into somewhat box form as shown in Fig. 7. The pyramidal shape and particularly the mitered sides 35 of the pad extensions 30 permit these extensions to mate together along the diagonal planes determined by the lines 38 to establish this somewhat box form and causing the walls 33 which were initially vertical but which are now horizontal to overlie the margins of the upper glass plate 18 with the margins 22 of the mask member 19 folded thereon, as best shown in Fig. 7, thus providing pressure which seals the margins 22 to the glass plates, it being understood that the adhesive face 20 of the member 19 is next to the glass. The extensions 30 thus form a partial closure for the under-cut recess 40 in the box-like structure formed and in which the slide is now pressed to effect the binding of the edges.

The sponge rubber of the pad desirably permits those portions of the pad which join the central portion 29 thereof to the extensions 30, to stretch as at 39 to accommodate the composite structure of the slide with yet sufficient pressure on the parts to effect a perfect seal. This is further enhanced by pushing the slide and pad completely through the opening 27 as shown by the arrow in Fig. 7, whereupon the pad is removed from about the slide, leaving the completed slide 42 as shown in Fig. 1, and restoring the pad, by its own resilience, to the cruciform outline shown in Figs. 5 and 6. It will be understood that considerable pressure is required to push the parts through the opening in the frame but that the sponge rubber absorbs the surplus pressure which is employed in excess of that necessary to effect the sealing action described.

The frame 26 thus is illustrative of means for folding the pad 28 into the desired shape to fold and press the margins of the flexible member 19 about the glass plates. So as to insure correct location of the pad on the frame with a minimum of play, the corner posts 32 desirably overhang the margins of the opening 27 at the corners of the margins as indicated at 41.

Manifestly, the invention is not limited to details of construction or sequence of steps of operation described for the purpose of exemplification. Furthermore, it is not necessary that all features of the invention be used conjointly, as various partial aspects thereof may be advantageously employed.

Having described my invention, I claim:

1. Apparatus for producing stereopticon slides embodying an initially unbound slide including a plate and edge binding therefor, comprising a cruciform resilient pad of sponge rubber or like material having a central portion conforming to the final shape and size of the slide and having four uniform mitered thickened extensions receiving the unfolded marginal binding thereon with the plate overlying the central portion, ridges on said extension forming stops for said binding, said extensions being readily yieldable at their juncture with said central portion to permit bending thereat and foldable into mating box form over said central portion with said faces at least partially disposed in a common plane parallel with said central portion and closely overlying margins thereof, and carrying the binding about the edge of the plate when the plate and binding are pressed upon said central portion and the extensions so folded.

2. Apparatus for producing stereopticon slides comprising a cruciform resilient pad of sponge rubber or like material having a central portion conforming to the final shape and size of the slide and having thickened mitered extensions having inner faces initially substantially perpendicular to said central portion and yieldable at their juncture with said central portion to permit bending thereat with said faces disposed in a common plane parallel with said central portion and closely overlying margins thereof.

3. Apparatus for producing stereopticon slides comprising a cruciform resilient pad of sponge rubber or like material having a central portion recessed to conform to the final shape and size of the slide and having uniform mitered thickened extensions yieldable at their juncture with said central portion to permit bending thereat and having initially parallel inner faces perpendicular to said central portion and foldable into mating box form over said central portion with said faces disposed in a common plane parallel with said central portion and closely overlying margins thereof, and means including a rigid frame having a central opening just slightly larger than said central portion for receiving the pad under pressure when folded therethrough, the pad having an embossment snugly received in said opening to initially fix the position of the pad on the frame and to thicken the central portion adjacent said juncture.

4. Apparatus for producing stereopticon slides comprising a cruciform resilient pad of sponge rubber or like material having a central portion recessed to conform to the final shape and size of the slide and having uniform mitered thickened extensions yieldable at their juncture with said central portion to permit bending thereat and having initially parallel inner faces perpendicular to said central portion and foldable into mating box form over said central portion with said faces disposed in a common plane parallel with said central portion and closely overlying margins thereof, means including a rigid frame having a central opening just slightly larger than said central portion for receiving the pad under pressure when folded therethrough, the pad having an embossment snugly received in said opening to initially fix the position of the pad on the frame, and corner posts on the frame received between said extensions, said posts having inner corners slightly overhanging said recess.

BERTEL J. KLEERUP.